US006538747B1

(12) United States Patent
Arnold

(10) Patent No.: US 6,538,747 B1
(45) Date of Patent: Mar. 25, 2003

(54) FLEXURE HINGE PHASE SHIFT ADAPTER FOR FIZEAU INTERFEROMETER

(75) Inventor: Steven M. Arnold, Minnetonka, MN (US)

(73) Assignee: Diffraction International, Ltd., Minnetonka, MN (US)

( * ) Notice: Subject to any disclaimer, the term of this patent is extended or adjusted under 35 U.S.C. 154(b) by 111 days.

(21) Appl. No.: 09/605,922

(22) Filed: Jun. 28, 2000

(51) Int. Cl.[7] .................................................. G01B 9/02
(52) U.S. Cl. ...................... 356/512; 359/824; 359/871
(58) Field of Search ............................... 356/450, 512, 356/513, 514, 515; 359/819, 822, 823, 824, 828, 872, 871

(56) References Cited

U.S. PATENT DOCUMENTS

| 4,383,763 A | * | 5/1983 | Hutchings et al. ........... 356/469 |
| 4,926,689 A | * | 5/1990 | Hanson ......................... 73/497 |
| 5,680,214 A | * | 10/1997 | Lamb et al. ................. 356/514 |

OTHER PUBLICATIONS

Brochure on Zymod Phase Shift Technology and Adapter, Publication Date Dec. 1, 1999 (Acknowledged prior art).

* cited by examiner

Primary Examiner—Samuel A. Turner
(74) Attorney, Agent, or Firm—Westman, Champlin & Kelly, P.A.

(57) ABSTRACT

An adapter for mounting on an interferometer to provide a phase shift of the reference transmission sphere or flat used on the output of the interferometer is made of a monolithic body separated into two portions. The first portion is a fixed end support portion that mounts on the interferometer, and the second portion is a movable end support portion that mounts the sphere or flat that is used for transmission of the optic beam. The movable end support portion is mounted and the fixed end support portion are connected through flexure hinges that permit axial movement between the support portions, and a single actuator can be used between the support portions for causing axial movement. The flexure hinges are located so the adapter is very stiff against all motions except axial motions.

19 Claims, 5 Drawing Sheets

US 6,538,747 B1

FLEXURE HINGE PHASE SHIFT ADAPTER FOR FIZEAU INTERFEROMETER

BACKGROUND OF THE INVENTION

The present invention relates to a phase shift adapter for an interferometer that supports a wavefront transmission element comprising a sphere or flat reference surface and precisely positions the element so that it can be translated parallel to the optic axis a distance on the order of an optical wave length and with an accuracy of a very small fraction of the wave length.

Fizeau interferometers have phase shifting structures for translation of wavefront transmission elements comprising reference flats or spheres through which an optical wavefront is transmitted. The sphere or flat can be loosely termed a lens, and will be called a lens or transmission element in this specification. These transmission elements have in the past been translated along the optical axis by three piezoelectric translators or actuators that are arranged symmetrically with respect to the optical axis. The translators and the electrical balancing networks needed for control are high priced and drive up the cost of the overall system.

A typical prior art interferometer system is the Mark IVxp made by Zygo. The present phase shift adapter will operate with such an interferometer using the standard bayonet mount that is present on the frame of the interferometer.

The present adapter thus can mount onto existing interferometers and provide the advantages of a mounting that can be translated axially accurately, easily and at overall lower cost, but which is very rigid in direction of unwanted movement.

SUMMARY OF THE INVENTION

The present invention relates to an output adapter for an interferometer that will mount a wavefront transmission element, comprising a flat or sphere for translatory movement along an optic axis. The adapter is a metal tube with a large center bore and a standard male bayonet on the end for attachment to the accessory bayonet mount of an interferometer. An accessory bayonet mount is provided on the opposite end for attachment of a wavefront transmission element, comprising a sphere or flat. The phase shift adapter thus installs between the interferometer bayonet and the transmission sphere or flat.

The body of the present phase shift adapter is a monolithic structure, and is separated into a fixed end support portion that mounts on the interferometer or frame and a movable end support portion for mounting the beam transmission element. The fixed end support portion and movable end support portion are connected by integrally formed flexure hinges. The two support portions are separated by gaps or slits formed in the monolithic structure by wire electrical discharge machining or similar machining. The flexure hinges also are formed by the same process, as well as by drilling holes where needed.

Four flexure hinges are arranged at the vertices of a parallelogram, nominally a rectangle, with the flexure hinges being formed by eight flexures defining four hinge links, one at each flexure hinge, as shown. The movable end support portion mounting the optical transmission element can be extended from the fixed end support portion in an optical axial direction of the optic wavefront by bending of the flexures and the rotation of the hinge links. All other motions are constrained by the relative rigidity of the fixed end support, and by the resistance of the flexure hinges to torsion and shear. A single piezoelectric translator or actuator is installed between the movable end support portion and the fixed end support portion, and the piezoelectric translator provides very precisely controlled axial motion of the movable end support portion. The flexure hinges act to restrain any motion of the movable end support portion other than axial motion, so only one piezoelectric translator or actuator is necessary.

The movable end support portion can be preloaded mechanically by compression springs acting in opposition to the piezoelectric translator to urge the movable end support toward the fixed end support of the phase shift adapter.

Another aspect of the present arrangement is mechanical damping of the movable end support portion by using plugs of an elastomeric material inserted or injected into holes drilled along a cut or gap that separates the two support portions and extends between the axially spaced flexure hinges on each side of the adapter.

The adapter does not require tilt and tip adjustment knobs that are common in most commercial interferometer bayonet mounts, in that the standard bayonet mount tilt and tip adjustments can be used.

DETAILED DESCRIPTION OF THE ILLUSTRATIVE EMBODIMENTS

Figure 1:
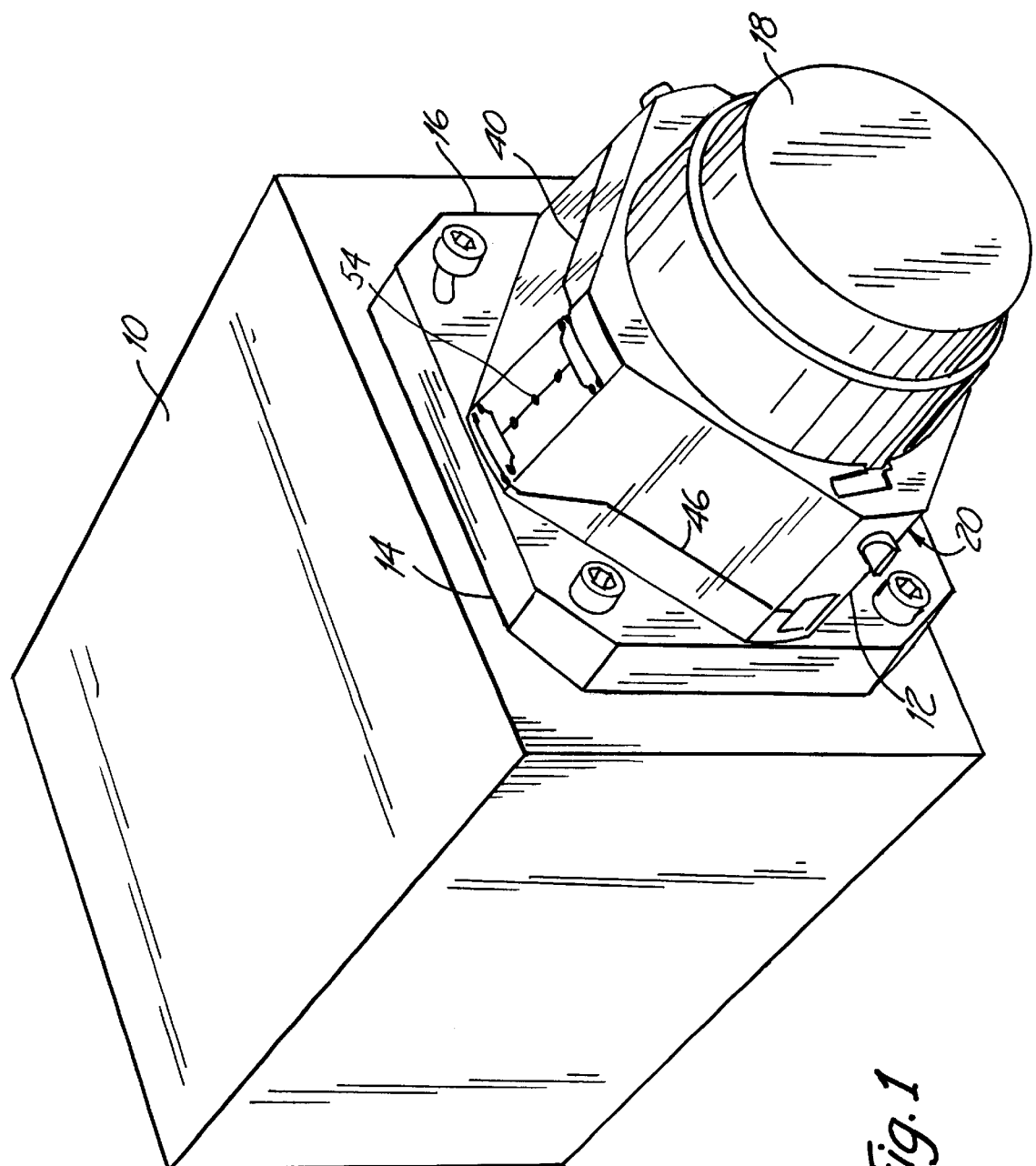
FIG. 1 is a schematic perspective view of a typical interferometer system showing a phase shift adapter made according to the present invention installed thereon.

Referring to FIG. 1, a typical interferometer is illustrated generally at 10, and includes the usual optical source on the interior, which directs a collimated wavefront outwardly through a phase shift adapter made according to the present invention and illustrated generally at 12. The phase shift adapter is mounted onto a collar or mount 14 using a well known bayonet coupling. The opposite end of the adapter 12 mounts a beam transmission element comprising a flat or sphere (lens) 18 is supported in a normal manner. Tilt and tip adjustment screws can be incorporated in the mount 14 for tilting the flat or sphere that transmits the optical beam for alignment purposes.

Figure 2:
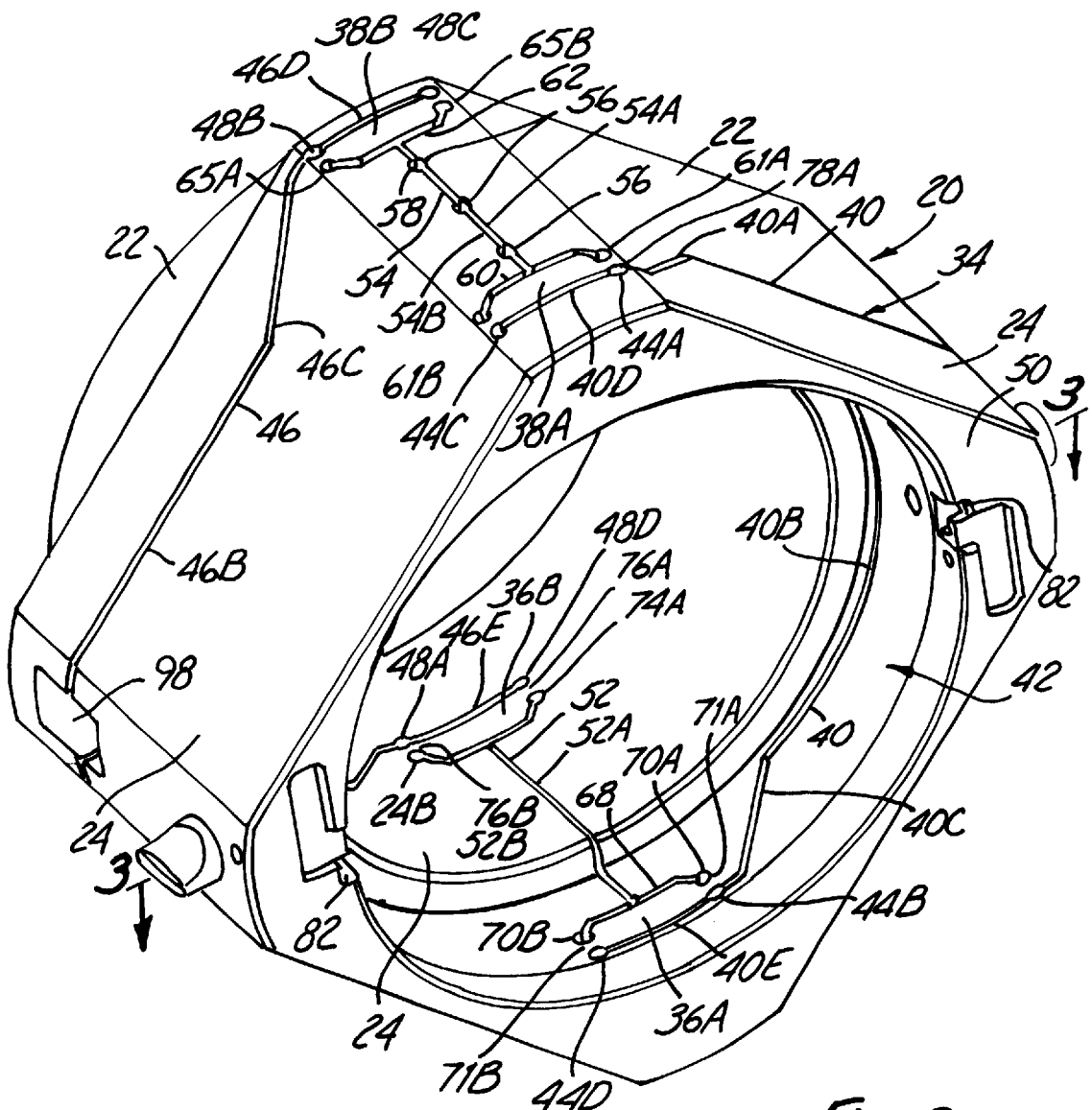
FIG. 2 is a front perspective view of the phase shift adapter made according to the present invention.
Figure 3:
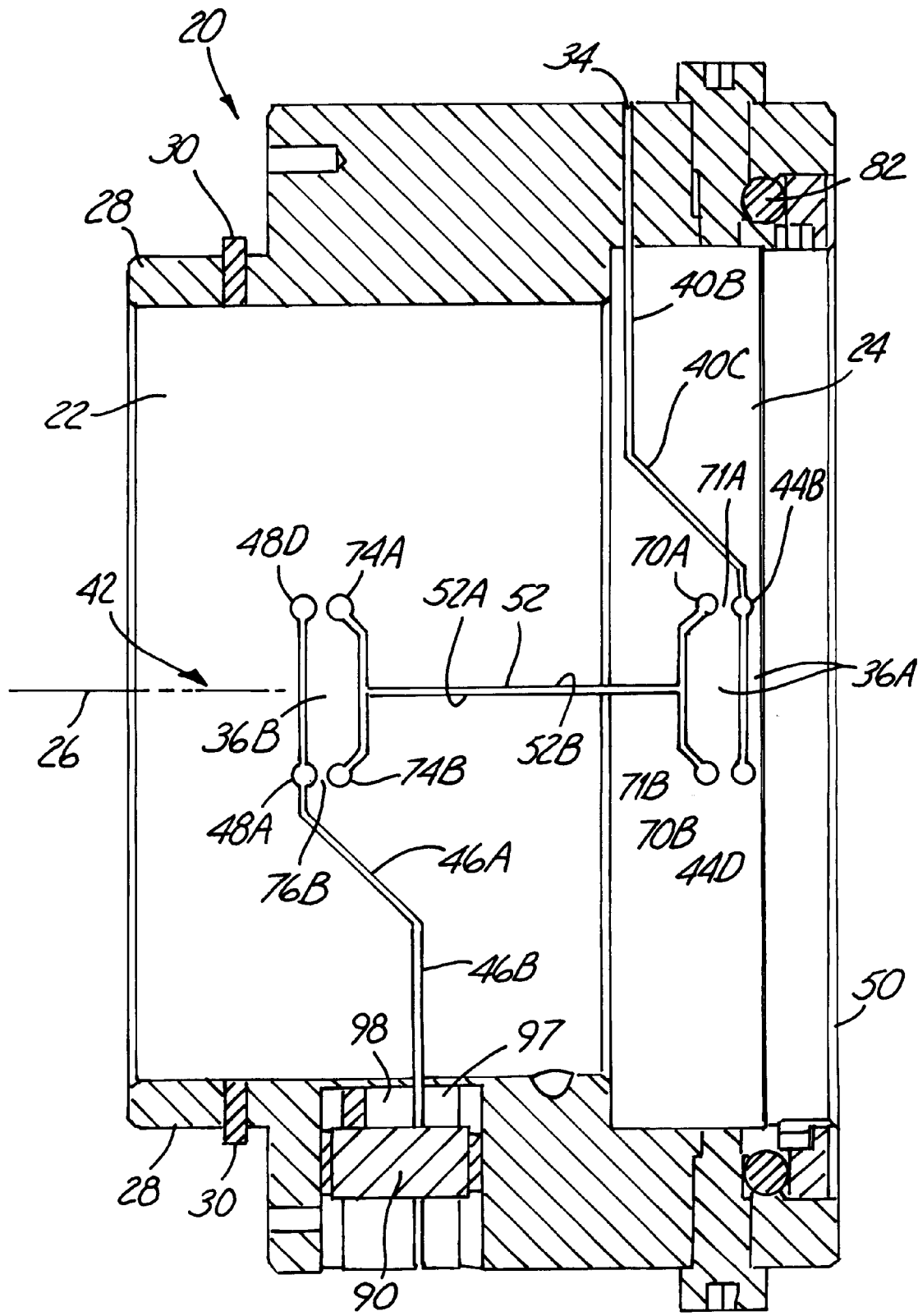
FIG. 3 is a sectional view taken on line 3—3 in FIG. 2.

The phase shift adapter 12 of the present invention, as shown in FIGS. 2–5 is a unitary body 20, that includes a base or fixed end support portion 22, and a translatable or movable end support portion 24 that can be moved along a central longitudinal optic axis 26 shown in FIG. 3 for example. The fixed end support portion 22 of unitary body 20 has a reduced cylindrical end portion 28 that includes bayonet attachment pins 30 so that the cylindrical portion 28 forms a male bayonet that can be attached to standard bayonet bases used with interferometers.

The body 20 is separated into the two support portions 22 and 24 so that the translatable or movable end support portion 24 can move axially relative to the fixed end support portion 22. The fixed end support portion 22 is mounted on the stationary base of the interferometer housing. The translatable or movable end support portion 24 is separated from the fixed end support portion 22 along machine cut slits or gaps shown generally at 34, 40, 46, 52 and 54, which includes specifically identified slits.

Movable end support portion 24 is connected to the stationary or fixed end support portion 22 through flexure hinges 35A, 35B, 35C and 35D. Each of the flexure hinges includes hinge links with flexures or hinges at the opposite ends thereof. The flexure hinges 35A and 35B include axially spaced hinge links 36A and 36B on one side of the body 20, and the flexure hinges 35C and 35D include axially spaced hinge links 38A and 38B at a location 180° from (or diametrically opposite from) the hinge links 36A and 36B. The separation slits 34 include a forward part annular separation slit 40, that runs from hinge link 38A around a central bore 42 to the hinge link 36A. Bores or radial holes are formed at the ends of the slits defining the hinge links 36A, 36B, and 38A and 38B. The slits which are made to separate the fixed and movable end support portions 22 and 24, such as the slit 40, can be formed by wire electrical discharge machining (wire-EDM).

The separation slit 40 is a part annular cut and extends from a hole or bore 44A at one end of the hinge link 38A, along an offset or angled slit portion 40A, and then extends along a radial plane in a slit portion 40B, that joins an offset or angled slit portion 40C. The separation slit 40 joins a bore 44B at the end of the hinge link 36A. The end support portions 22 and 24 are separated between hinge links 36B and 38B with a part annular cut slit or gap 46, which extends from a bore 48A along an angled or generally offset slit portion 46A and then extends annularly along a radial plane at a slit portion 46B around the center bore 42 to an angled or offset slit portion 46C to join a drilled bore 48B at the end of hinge link 38B.

In FIG. 2, it can be seen that there is an axial slit 52 joining the hinge links 36A and 36B, and an axial slit 54 joining the hinge links 38A and 38B, which in part serve to separate the fixed end support portion 22 from the movable end support portion 24.

It can thus be seen that the slits 40 and 46 together extend around the bore 42 and the portions of the housing 20 that are on the side of the separation slits 40 and 46 toward the front face 50 are all part of the movable or translatable end support portion 24. For identification, the numeral 24 has been used in several places in FIG. 2 to show the various section of the end support portion that move as a unit.

It can be seen that the axial distance from the slit 46 to the front face 50 of the translatable or movable end support portion 24 is greater than the axial distance from the slit 40 to the front face 50. The two sections of the translatable end support portion defined by the slits 40 and 46 move as a unit at the flexing or hinging ends of the hinge links.

The translatable end support portion 24 of the body 20 and the stationary or fixed end support portion 22 are hinged together with the flexure hinges 35A, 35B, 35C and 35D which are formed with flexure hinges at the ends of the respective hinge links 36A, 36B, 38A and 38B. It can be seen that the flexures are formed between the radial bores at the ends of the slits forming the hinge links 36A, 36B, 38A and 38B. The slit 54 joins hinge link defining slits 60, with bores 61A and 61B at the opposite ends of the slits 60 to define one side of the hinge link 38A. The other side of hinge link 38A is defined by slit portion 40D, which joins and is a part of slit 40. Slit portion 40D extends between bore 44A and a bore 44C. The narrow piece of material between the bores 44A and 61A and between bores 44C and 61B define flexures 78A and 78B.

The hinge link 38B is defined one side by a slit 62, that ends in bores 65A and 65B. The other side of hinge link 38B is defined by a slit portion 46D which joins and is a part of slit 46. The slit portion 46D extends between bore 48B and a bore 48C. The material piece between bores 65A and 48B forms a flexure 80A and the material between bore 65B and 48C forms a flexure 80B.

The axially extending slit 52 on a side of the body opposite from axially extending slit 54, joins a slit 68 that defines a side of the hinge link 36A, and which has closely spaced bores 70A and 70B at its opposite ends. The hinge link 36A is further defined by a slit portion 40E that joins and is part of slit 40. Slit portion 40E extends between bores 44B and 44D. The material between the bores 70A and 44B and 70B and 44D form flexures 71A and 71B.

The opposite end of the slit 52, which is adjacent the bayonet portion for mounting the stationary end support portion 22, joins a transverse slit 72 that ends in bores 74A and 74B. The slit 72 defines one side of hinge link 36B. The opposite side of hinge link 36B is defined by a slit portion 46E which joins and is part of slit 46. Slit portion 46E extends between bores 48A and 48D. The material between bores 74A and 48D forms a flexure 76A and the material between bores 74B and 48A forms a flexure 76B.

The side surface of the slit 52 extending along edge or line 52A is on the stationary or fixed end support portion 22 of the body 20, and the side surface of slit 52 extending along edge or line 52B is part of the translatable or movable end support portion 24 of the body. The side surface of slit 54 extending along edge or line 54A is part of the stationary or fixed end support portion 22 of the body 20 and the side surface of slit 54 extending along edge or line 54B is on the movable end support portion 24 of the body 20.

Radial bores 56 can be formed along slit 54, with part of each bore 56 in each of the stationary portion 22 and translatable portion 24. The bores 56 can be filled with an elastomeric material indicated at 58, to provide for dampening movement of the translatable end support portion 24 axially along the optic axis 26, which lies on the axis of the bore 42. The number and hardness of elastomeric elements 58 can be selected to suit existing conditions. As shown there are three bores 56 at the slit 54, and there can be the same number of bores at the slit 52, if desired.

The translatable end support portion 24 is movable axially relative to the stationary end support portion 22 of the body 20 on the eight separate flexure formed at the ends of hinge links 36A, 36B, 38A and 38B. The flexures described are formed by thin wall portions that permit hinging movement.

The end face 50 has suitable, standard bayonet connectors shown generally at 82 for attaching the flat or sphere transmission element (lens). The movable end support portion 24 thus hinges and moves easily in an axial direction, that is parallel to the slits 52 and 54 and parallel to the optic axis 26, about the eight flexure hinges that have been described, at the ends of the hinge links 36A, 36B, 38A and 38B and forming four flexure hinges 35A, 35B, 35C and 35D. However the movable end support section 24 is very stiff in resisting any other movements with respect to the stationary end support portion. The movable end support portion will move only axially.

The movement of the movable end support portion 24 is controlled by a piezoelectric actuator 90 (see FIG. 4) that acts against a first flat surface 92 that is parallel to the slit 46B and formed in a recess or pocket 97 in end support portion 24. A second flat surface 94, which is parallel to the surface 92, is formed in a recess or pocket 98 on fixed end support portion 22. The pockets 97 and 98 are on opposite sides of slit 46B. The actuator 90 is controlled with a suitable controller 96 that provides a voltage to the piezoelectric actuator to change its length. It can be seen that the slits 40 and 46 will separate from their rest position, upon the application of a voltage of the desired polarity onto actuator 90. The single piezoelectric actuator 90 will control the movement of the movable or translatable end support portion 24 of the body 20 relative to the stationary end support portion 22, which is mounted to the interferometer frame. The amount of movement needed is very small, but can be very precisely controlled. The actuator 90 is fitted into the recesses 97 and 98 that are formed radially inward from the outer surface of the body. The parallel surfaces 92 and 94 are precisely machined when forming the recesses.

A mechanical preload that will preload the actuator 90 and will provide a known load that resists the axial separation of the movable portion 24 and the stationary portion 22 is provided with springs at desired locations near the actuator 90. As shown, a pair of capscrews 100 are threaded into bores 102 in the translatable portion. The head of each of the capscrews 100 is in a counter bore 104 in the end of the stationary support portion 22 with a compression spring 106 under the head. The springs can be compressed by threading the screws 100 to preload the actuator 90. The spring 106 will compress more as the actuator 90 lengthens.

The total distance of movement of the translatable or movable end support portion 24 relative to the stationary end support portion 22 of the body 20 a will be in the range of one optical wave length of the light being transmitted. The accuracy of movement is a small fraction of the wave length. The translating end support portion 24 will precisely move the mass of the optical flat or sphere (lens) and its housing without tilt.

Figure 4:
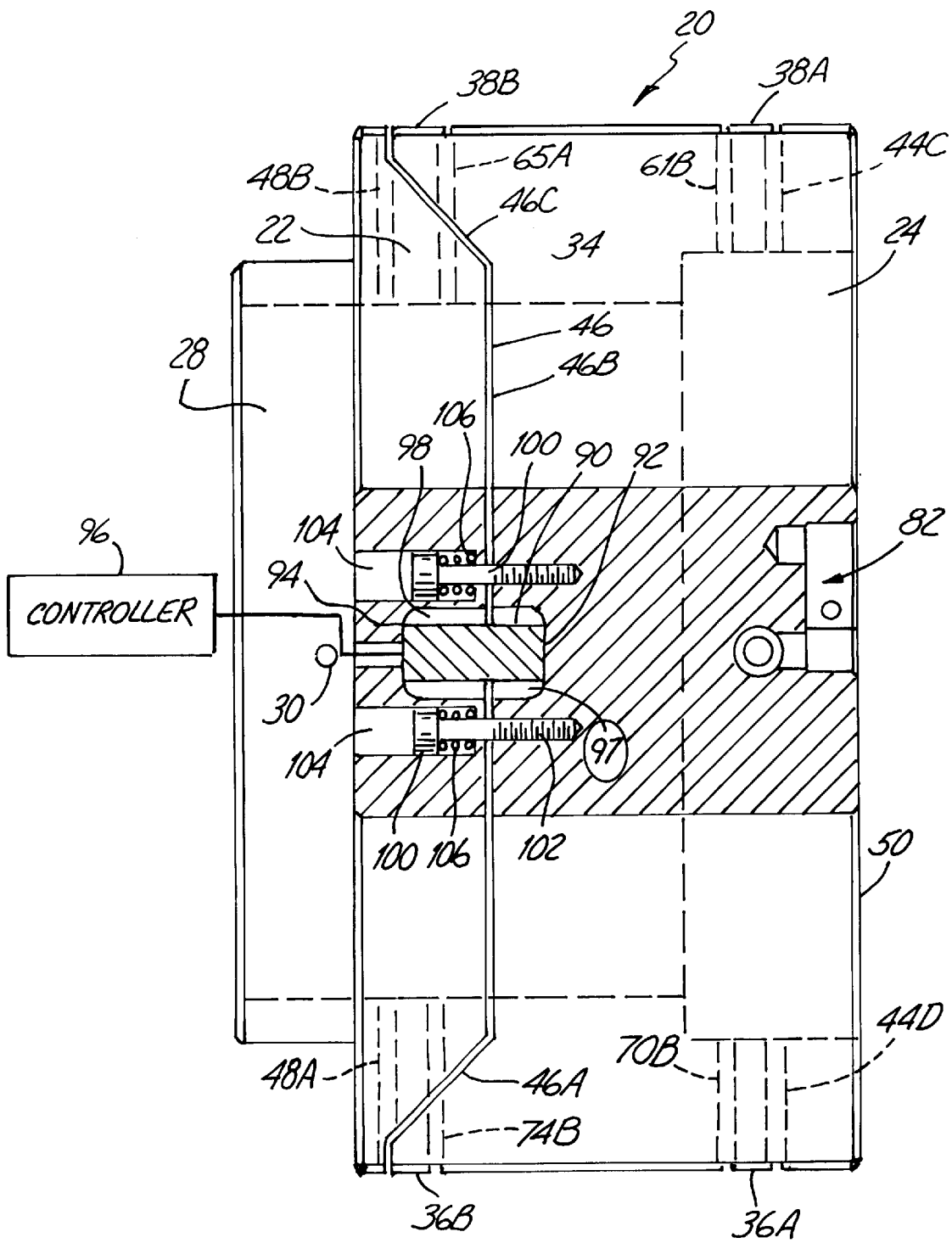
FIG. 4 is a side view of the phase shift adapter with parts in section and parts broken away.
Figure 5:
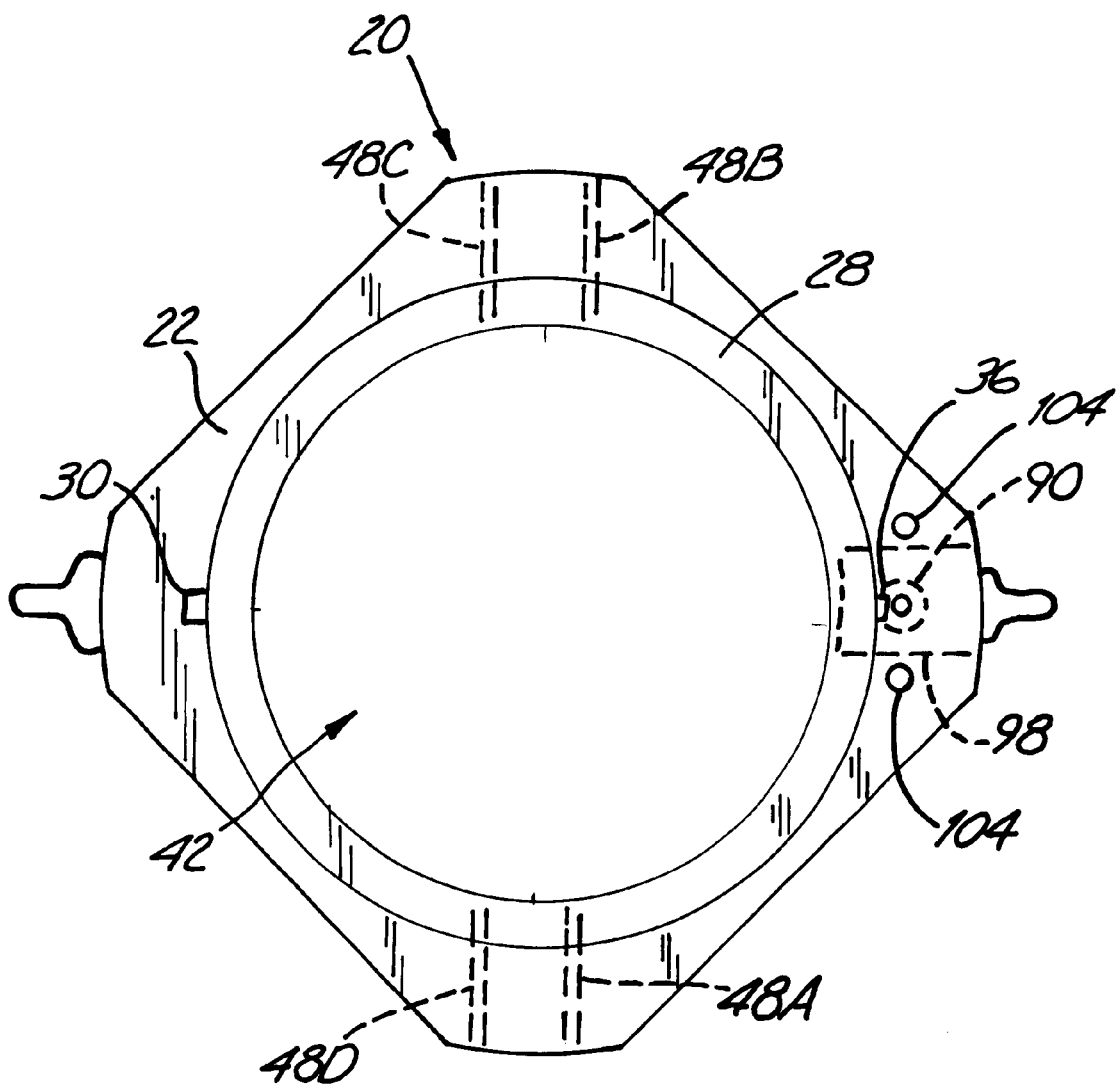
FIG. 5 is an end view of the adapter showing a bayonet mount on the fixed end support portion.

As can be seen in FIG. 4, the flexure hinges 35A, 35B, 35C and 35D are arranged in a rectangle, and the centers of the flexure hinge forms a parallelogram. The flexure hinges are arranged to insure that there will not be any tilt, and that the actuator 90 provides the axial movement required. One side of the rectangle is on the fixed end or stationary portion, and the opposite rectangular side comprises the translatable end of the adapter body. The two remaining rectangular sides are perpendicular the translation axis, and comprise short rigid links. The flexure hinge structure penetrates through the entire body of the phase shift adapter and is divided by the radial bores into eight flexures defining four hinge links, as described.

The hinge links 36A, 36B, 38A and 38B with flexures at their opposite ends form the four flexure hinges that connect the opposite ends of the adapter together.

All of the other motions of the movable end support portion 24 are constrained by the relative rigidity of the fixed end, the moving end and the hinge links and by the resistance of the flexure hinges to torsion and shear.

The axis of the actuator 90 is preferably positioned at 90° or perpendicular to the hinges and outside of the central aperture bore. The use of the elastomer dampeners 58, as described, is an optional feature that can be utilized if necessary.

Because the body is a monolith, or single body with the portions separated out by integrally formed flexure hinges, very precise locations of the input or the stationary bayonet end and the face surface can be achieved without precision fitting or assembly.

Although the present invention has been described with reference to preferred embodiments, workers skilled in the art will recognize that changes may be made in form and detail without departing from the spirit and scope of the invention.

What is claimed is:

1. An adapter for mounting an optical element to a stationary mount such that the optical element is movable along a central axis of an open light transmitting central bore, comprising a fixed end support portion having a connector for mounting to the stationary mount, and a movable end support portion for supporting the optical element, and a plurality of flexures joining the movable end support portion and the fixed end support portion, the flexures being symmetrically located on opposite sides of a central axis of the central bore and constraining movement between the fixed and movable end support portions in directions along the central axis.

2. An adapter for mounting to a stationary mount and supporting an optical element that is movable along a central axis, comprising a fixed end support portion having a connector for mounting to the stationary mount, and a movable end support portion for supporting the optical element, the end support portions defining a central open bore, and a plurality of flexure hinges joining the fixed end support portion and the movable end support portion, the flexure hinges being symmetrically located on opposite sides of the central bore and comprising two pairs of flexure hinges, the first pair of flexure hinges being spaced axially on a first side of the bore, and the second pair of flexure hinges being spaced axially on a second side of said bore and diametrically opposite from and aligning with the first pair of flexure hinges.

3. The adapter of claim 2, where the flexure hinges of each pair are joined by gaps which separate the movable end support portion from the fixed end support portion, the gaps being formed by axially extending, facing surfaces of the movable end support portion on one side of the gap and of the fixed end support portion on the other side of the gap.

4. The adapter of claim 2, wherein the flexure hinges comprise flexures at opposite ends of hinge links and wherein a first hinge link of the first pair is separated from a diametrically opposite and aligning first hinge link of the second pair by a gap separating the movable end support portion from the fixed end support portion, and wherein a second hinge link of the first pair is separated from a second hinge link of the second pair by a gap between the movable end support portion and the fixed end support portion that extends on an opposite side of the bore from the gap between the one hinge link of the first pair and the diametrically opposite hinge link of the second pair.

5. The adapter of claim 4 and an actuator positioned to provide an axial force tending to separate one of the gaps.

6. The adapter of claim 5, wherein said actuator comprises a piezoelectric actuator controlled from a central control member.

7. The adapter of claim 5 including at least one spring for preloading the movable end support portion toward the fixed end support portion.

8. The adapter of claim 7, wherein said at least one spring is adjacent said actuator, and there being only one actuator on one side of the central bore.

9. The adapter of claim 1, wherein the fixed end support portion has a bayonet connector for connecting it to a stationary mount.

10. The adapter of claim 9, wherein said movable end support portion has an outer end with a second bayonet connector for supporting a translatable element.

11. The adapter of claim 1, wherein said movable end support portion and said fixed end support portion are formed from a monolithic block of material.

12. An adapter for mounting a beam transmission element for use with an interferometer, said adapter having a connector on one end for mounting to a stationary mount on the interferometer and a mounting adapter at an opposite end for mounting the beam transmission element, said adapter having a central bore with a central longitudinal axis, and comprising a fixed end support portion and a movable end support portion formed by a pair of gaps each extending substantially 180° around the bore on opposite sides of the bore and being offset axially from each other, and at least one pair of flexure hinges on one side of the bore connecting the movable end support portion and the fixed end support portion, said flexure hinges being positioned at axially spaced locations on the one side of the bore.

13. The adapter of claim 12 and a second pair of flexure hinges at aligning axially spaced locations on a diametrically opposite side of the bore from the at least one pair of flexure hinges, the second pair of flexure hinges each connecting the movable end support portion and the fixed end support portion.

14. The adapter of claim 13, wherein said flexure hinges comprise hinge links having flexures at opposite ends thereof to form eight hinges, the hinge link bodies joining portions of the movable end support portion and the fixed end support portion at ends thereof through the eight hinges, the hinges flexing when the movable end support portion moves axially relative to the fixed end support portion.

15. The adapter of claim 12, wherein said adapter is formed from a unitary body, and the fixed end support portion and the movable end support portion are separated by slits through the unitary body extending from an exterior to the bore.

16. The adapter of claim 13, wherein said hinge links on each of the diametrical sides are joined by axial slits between the hinge links on the same side that separates the movable end support portion from the fixed end support portion.

17. The adapter of claim 16, wherein there is an elastomeric material plug spanning at least one of the axial slits and engaging both the movable end support portion and the fixed end support portion for damping axial movement along at least one of the axial slits.

18. The adapter of claim 14 and an actuator coupled between the movable end support portion and the fixed end support portion and spanning one part annular gap to provide a force to separate the movable end support portion from the fixed end support portion.

19. An adapter for mounting between a stationary mount and a translatable element that is movable along a central axis, the adapter having an outer housing defining a central aperture centered on the central axis, the housing comprising a fixed end support portion having a connector for mounting to the stationary mount, and a movable end support portion for supporting the translatable element, and a plurality of flexures joining the first fixed end support portion and the movable end support portion to control relative movement between the fixed end support portion and the movable end support portion along the central axis, the flexures being symmetrically located on opposite sides of a central axis of the aperture, and a piezoelectric actuator positioned on a side of the housing midway between the symmetrically located flexures to provide a force in direction along the central axis to separate the fixed end support portion and movable end support portion against resilient loading from the flexures.

* * * * *